July 16, 1968
T. F. DOUMANI
3,393,247
MANUFACTURE OF $\Delta^1$ DIALIN
Filed March 25, 1966
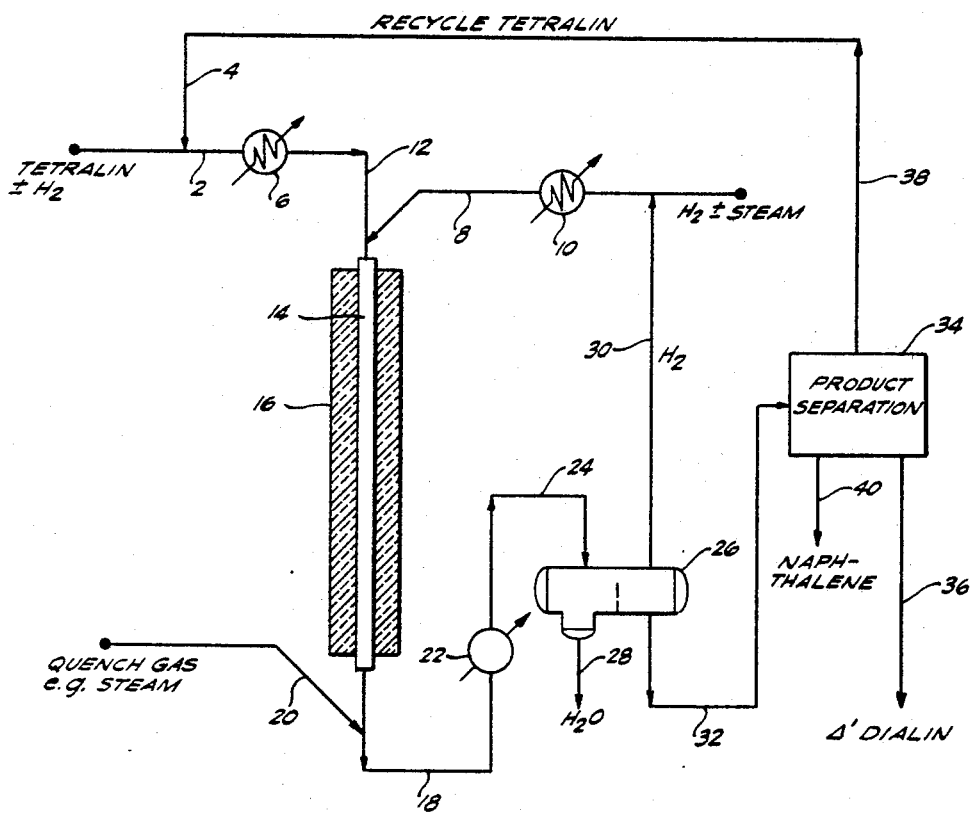
INVENTOR.
THOMAS F. DOUMANI
BY
Lannas S. Henderson
ATTORNEY — # United States Patent Office 3,393,247
Patented July 16, 1968

3,393,247
MANUFACTURE OF $\Delta^1$ DIALIN
Thomas F. Doumani, Fullerton, Calif., assignor to Union Oil Company of California, Los Angeles, Calif., a corporation of California
Filed Mar. 25, 1966, Ser. No. 537,547
6 Claims. (Cl. 260—668)

ABSTRACT OF THE DISCLOSURE

Tetralin is subjected to thermal dehydrogenation at temperatures of 1000-2000° F. and contact times of 0.001-1.0 second to produce $\Delta^1$ dialin.

---

This invention relates to new methods for the manufacture of $\Delta^1$ dialin (1,2-dihydronaphthalene) by the thermal dehydrogenation of Tetralin (1,2,3,4-tetrahydronaphthalene). $\Delta^1$ dialin is useful in the formation of polymers, and particularly the formation of copolymers with other vinyl compounds and/or with butadiene, the copolymers being of especial interest in the formulation of elastomers. The commercial utilization of $\Delta^1$ dialin in polymers and copolymers has been retarded by the lack of an economical method for the manufacture of the monomer. According to the present invention, a substantial reduction in manufacturing costs is achieved.

It is known in the art that Tetralin can be converted to naphthalene by thermal dehydrogenation at temperatures in the range of about 1200-1400° F. (U.S. Patent No. 2,729,688). I have now discovered that substantial yields of $\Delta^1$ dialin (to the practical exclusion of the 1,4 isomer, $\Delta^4$ dialin) can be achieved by the thermal dehydrogenation of Tetralin in the presence of added hydrogen at temperatures between about 1,000° and 2,000° F. if the holding time at these temperatures is limited to values below one second, preferably below about 0.1 second. The most critical aspect of the invention is holding time; at these elevated temperatures, Tetralin exhibits a strong tendency to dehydrogenate to the most stable ultimate configuration, namely naphthalene. Hence, to achieve significant yields of the intermediate dihydronaphthalene, and to minimize the formation of naphthalene, it is necessary to maintain careful control and correlation of temperatures and holding times. If temperatures in excess of about 1,200° F. are maintained for more than one second, the principle conversion product is naphthalene and the yield of $\Delta^1$ dialin is substantially nil.

Other critical aspects of the invention include the provision of a reaction environment which is substantially devoid of catalytic surfaces, and wherein a substantial partial pressure of hydrogen exists. Catalytic surfaces such as iron have been found to induce the formation of coke, apparently by the dehydropolymerization of naphthalene. This coke in turn has been found to be a very active catalyst for dehydrogenation. Hence, as soon as any significant amount of coke is formed in the reaction zone the dehydrogenation reaction becomes substantially uncontrollable and the major product is naphthalene. Hydrogen appears to exert a favorable influence in preventing the incipient formation of coke, and also tends to inhibit complete dehydrogenation to naphthalene.

In order to insure a reaction environment free of catalytic surfaces, it is necessary to provide a reactor the internal walls of which are free of active catalytic materials such as metallic iron and the like. This may be accomplished for example by providing a tubular reactor constructed of quartz or chrome-nickel alloy of the 8–18 or 25–20 type, or alternatively a reactor having internal ceramic surfaces. The reaction may be carried out either in an open tubular reactor, or in a packed tube wherein the packing is an inert, low surface area material such as quartz. Alternatively, a fluidized reactor system may be employed utilizing finely divided quartz or other inert material as the heating and cooling media. A suitable reactor of this nature is illustrated for example in U.S. Patent No. 2,885,447.

The conditions to be observed in the practice of the invention include temperatures in the range of about 1,000° to 2,000° F., preferably between about 1,200° and 1,600° F. Preferred pressures are substantially atmospheric, i.e., between about 5 and 50 p.s.i.g. However, pressures substantially below atmospheric and up to about 5,000 p.s.i.g. may also be utilized if desired. Hydrogen is utilized in ratios ranging between about 100 and 20,000 s.c.f. per barrel of liquid Tetralin feed, preferably between about 1,000 and 10,000 s.c.f. per barrel. Inert gaseous diluents may also be utilized such as steam, nitrogen, argon and the like.

Operative holding times to be observed under the above reaction conditions range between about 0.0001 and 1 second, preferably between about 0.001 and 0.1 second. For example, at about 0.02 second holding time at 1,400° F., a yield of about 20-30 percent of $\Delta^1$ dialin is normally obtained.

Special techniques are of course required in order to control the holding time within the short periods required. Basically, means must be provided for rapidly heating the feed mixture to the desired temperature, and for rapidly quenching the product gases to below 1,200° F., preferably below 1,000° F. In general it is impractical to obtain these objectives by the normal indirect heat-exchange methods. Conventional indirect heat-exchange methods may be employed for vaporizing and preheating the feed up to about 800° to 1,000° F., and for completing the cooling and condensing of product vapors after they have been quenched to below about 1,000° F. The critical rapid heat-up from about 1,000° F. to the desired peak reaction temperatures is preferably achieved by intimately and rapidly mixing superheated gases such as hydrogen or steam, or preheated, finely divided solids such as quartz, with the vaporized feed mixture. Rapid quench of the product gases is preferably achieved by the same techniques using relatively cool quench gases or solids. The holding time between final heat-up and quench is governed by reactor dimensions and gaseous feed rates.

Reference is now made to the accompanying drawing which illustrates more specifically one suitable modification of the invention. The fresh Tetralin feed stock is pumped in liquid form, with or without added hydrogen, into line 2 where it is blended with recycle Tetralin from line 4. The resulting mixture is then heated and vaporization completed in preheater 6 which also raises the temperature of the gaseous mixture to about 800° to 1,000° F. The final heat-up to desired reaction temperature is obtained by jetting superheated hydrogen and/or steam or other inert gas, from line 8 and preheater 10 into transfer line 12 at a point immediately preceding the inlet to tubular reactor 14 which is surrounded by installation 16. As noted, the dimensions of reactor 14 are correlated with the total gaseous input via lines 12 and 8 so as to achieve the desired holding time.

Effluent from reactor 14 is withdrawn via transfer line 18, and immediately quenched by the turbulent injection of quench gas such as steam via line 20. The resulting mixture in line 18, now at a temperature of e.g. about 800° F., is then passed through condenser 22 to cool the mixture down to about 100° to 200° F., and the resulting condensate and gases are transferred via line 24 into separator 26. Condensed water is withdrawn via line 28, while recycle hydrogen or other inert gas is withdrawn via line 30 and recycled to preheater 10.

The hydrocarbon condensate in separator 26 is withdrawn via line 32 and transferred to product separation unit 34 which may comprise a fractional crystallization unit, with or without supplemental fractional distillation equipment. The melting points and boiling points of the principal hydrocarbon products are as follows:

|  | Boiling Point, °C. | Melting Point, °C. |
| --- | --- | --- |
| Naphthalene | 218 | 80.2 |
| Tetralin | 207 | −30 |
| $\Delta^1$ Dialin | 206-7 | −9 |

In view of the close proximity of the boiling points of Tetralin and $\Delta^1$ dialin, fractional distillation is impractical for separation of these two components. However, the naphthalene component may be separated by distillation if desired, though this involves the disadvantage of distilling overhead all of the Tetralin and $\Delta^1$ dialin, which comprise the major portion of the hydrocarbon effluent. Preferably, therefore, the naphthalene is first separated by fractional crystallization at temperatures down to about 0° to 20° C. and withdrawn via line 40. The remaining mother liquor is then cooled down to about −10° to −20° C. to recover the bulk of the $\Delta^1$ dialin which is removed as product via line 36, while the final mother liquor consisting essentially of Tetralin is recycled via line 38. Other methods such as solvent extraction may also be employed for product separation.

The following examples are cited to illustrate more specifically certain preferred modes of procedure and the results obtainable, but are not to be construed as limiting in scope.

Example I

Tetralin at the rate of 100 ml. per hour, and hydrogen at a rate of 8.1 s.c.f. per hour, were mixed, preheated and passed through a vertical 18 mm. I.D. Vycor glass tube packed with −10−+20 mesh quartz granules, the arrangement for quench and pre-heating being substantially as illustrated in the drawing. The temperature in the reaction zone was 1,350° F., and the residence time at that temperature was about 0.02 second. The liquid product collected over a one-hour run (95 ml.) analyzed as follows: $\Delta^1$ dialin, 20 weight-percent; naphthalene, 7 weight-percent; Tetralin, 67 percent; other lighter liquid hydrocarbons, 6 percent. The hydrogen gas recovered after use analyzed 98.75 percent hydrogen with minor amounts of lighter gaseous hydrocarbons.

Example II

Another run was carried out as described in Example I except that the residence time at 1,300° F. was adjusted to one second. In this case, the liquid product contained only traces (less than about 1 percent) of $\Delta^1$ dialin, the major product being naphthalene.

Example III

Still another run was carried out under the conditions described in Example I except that the Vycor reaction tube was replaced with a Type 321 stainless steel tube. In this case, the liquid product contained 7.6 percent $\Delta^1$ dialin and 37.7 percent naphthalene. Substantial amounts of coke were found deposited in the reaction zone. It is thus apparent that the catalytic effects of the reactor walls were detrimental, leading to the deposition of coke with resultant accelerated dehydrogenation rates.

Example IV

Another run was carried out under the conditions described in Example I except that an open Vycor glass tube reactor was employed, and feed rates and temperatures were adjusted to achieve a reaction temperature of about 1,525° F. for a holding time of about 0.002 second. In this case, the liquid product analyzed 21.4 percent $\Delta^1$ dialin, 6.8 percent naphthalene, and 67.7 percent Tetralin. It is thus apparent that raising the temperature and reducing the residence time achieves substantially the same results as those described in Example I.

Results analogous to those described in the foregoing examples are obtained using other conditions and modifications of the process described herein. The true scope of the invention is intended to be embraced by the following claims.

We claim:
1. A process for the manufacture of $\Delta^1$ dialin which comprises heating a mixture of Tetralin and hydrogen to a temperature between about 1,000° and 2,000° F., maintaining said reaction temperature for a holding time between about 0.0001 and 1.0 second in a reaction zone which is substantially devoid of catalytic surfaces, then immediately quenching the resulting gaseous mixture to a temperature below about 1,000° F., and recovering $\Delta^1$ dialin from the reaction mixture.

2. A process as defined in claim 1 wherein said reaction temperature is between about 1,200° and 1,600° F., and said holding time is between about 0.001 and 0.1 second.

3. A process as defined in claim 1 when carried out at substantially atmospheric pressure.

4. A process as defined in claim 1 wherein an inert gaseous diluent is included in admixture with the reactants in said reaction zone.

5. A process as defined in claim 4 wherein said gaseous diluent is steam.

6. A process as defined in claim 1 wherein a stream of the Tetralin-hydrogen feed mixture is rapidly heated to said reaction temperature by injection of a superheated gas, and wherein the resulting mixture is passed through a tubular reaction zone and immediately thereafter is quenched by the injection of a cool, gaseous quench medium.

References Cited

UNITED STATES PATENTS 2,475,977 7/1949 Meier.
2,729,688 1/1956 Anderson et al.
2,775,629 12/1956 Anderson.

DELBERT E. GANTZ, *Primary Examiner.*

CURTIS R. DAVIS, *Assistant Examiner.*